US012056761B2

(12) United States Patent
Yang et al.

(10) Patent No.: US 12,056,761 B2
(45) Date of Patent: Aug. 6, 2024

(54) METHOD AND APPARATUS FOR MANAGING MEASUREMENT DEVICE BASED ON BLOCKCHAIN

(71) Applicants: Mettler-Toledo (Changzhou) Precision Instruments Ltd., Jiangsu (CN); Mettler-Toledo (Changzhou) Measurement Technology Ltd., Jiangsu (CN); Mettler-Toledo International Trading (Shanghai) Co., Ltd., Shanghai (CN)

(72) Inventors: JianQiang Yang, Jiangsu (CN); GuoJun Xie, Jiangsu (CN)

(73) Assignees: Mettler-Toledo (Chagzhou) Precision Instruments Ltd., Jiangsu (CN); Mettler-Toledo Measurement Technology Ltd., Jiangsu (CN); Mettler-Toledo International Trading (Shanghai) Co., Ltd., Shanghai (CN)

(*) Notice: Subject to any disclaimer, the term of this patent is extended or adjusted under 35 U.S.C. 154(b) by 581 days.

(21) Appl. No.: 17/174,236

(22) Filed: Feb. 11, 2021

(65) Prior Publication Data

US 2021/0248671 A1 Aug. 12, 2021

(30) Foreign Application Priority Data

Feb. 12, 2020 (CN) .......................... 202010089035.2

(51) Int. Cl.
*G06Q 30/0645* (2023.01)
*G06F 9/50* (2006.01)
(Continued)

(52) U.S. Cl.
CPC ....... *G06Q 30/0645* (2013.01); *G06F 9/5077* (2013.01); *G06Q 20/145* (2013.01);
(Continued)

(58) Field of Classification Search
CPC ............. G06Q 30/0645; G06Q 20/145; G06Q 20/401; G06Q 50/18; G06Q 2220/00; G06F 9/5077
See application file for complete search history.

(56) References Cited

U.S. PATENT DOCUMENTS 8,600,685 B2* 12/2013 Kalgren ................. G01D 18/00
702/182
9,805,196 B2* 10/2017 Ray ........................ H04L 9/3234
(Continued)

FOREIGN PATENT DOCUMENTS

EP          3594867 A1    1/2020
WO    WO 2019/227451 A1   12/2019

OTHER PUBLICATIONS

Extended European Search Report in EP Patent Application No. 20213067.0 dated Feb. 3, 2021.
(Continued)

*Primary Examiner* — John W Hayes
*Assistant Examiner* — Zehra Raza
(74) *Attorney, Agent, or Firm* — Knobbe, Martens Olson & Bear, LLP (57) ABSTRACT

A method for operating a measurement device using a blockchain. A blockchain system comprises a lease platform node or lease platform node device, a lessor client, and a lessee client. Existing state information about the measurement device is stored in the blockchain. The method can include receiving a lease order for the measurement device that is sent by a lessee client, sending a lease notification based on the measurement device to the lessor client to notify the lessor to send the measurement device to the lessee, receiving, after the lessee receives the measurement device sent by the lessor, a device state detection request sent by the lessee client or the measurement device, wherein the device state detection request comprises first current
(Continued)

state information about the measurement device, and detecting whether the first current state information matches the existing state information, and if yes, creating a lease contract for the measurement device.

20 Claims, 2 Drawing Sheets

(51) Int. Cl.
　　　*G06Q 20/14*　　　(2012.01)
　　　*G06Q 20/40*　　　(2012.01)
　　　*G06Q 50/18*　　　(2012.01)
(52) U.S. Cl.
　　　CPC ........... *G06Q 20/401* (2013.01); *G06Q 50/18* (2013.01); *G06Q 2220/00* (2013.01)

(56) References Cited

U.S. PATENT DOCUMENTS

| | | |
|---|---|---|
| 2017/0287090 A1 | 10/2017 | Hunn et al. |
| 2018/0007131 A1 | 1/2018 | Cohn et al. |
| 2020/0027295 A1* | 1/2020 | Bigert ...................... G07C 9/28 |
| 2020/0184548 A1* | 6/2020 | Rao ........................ G06Q 50/18 |
| 2020/0193255 A1* | 6/2020 | Manamohan ...... G06K 19/0723 |
| 2021/0216651 A1 | 7/2021 | Duan et al. |

OTHER PUBLICATIONS

Extended European Search Report in European Patent Application No. 20213068.8 issued Feb. 5, 2021.

* cited by examiner

METHOD AND APPARATUS FOR MANAGING MEASUREMENT DEVICE BASED ON BLOCKCHAIN

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTIONS

Technical Field

One or more embodiments relate to the technical field of blockchains, in particular to a method and apparatus for facilitating leasing of a measurement device based on a blockchain.

Background Art

In a traditional device leasing process, there exists many problems. For example, a lessee might damage a leased device due to abnormal use but does not admit it and refuses to pay compensation. A lessor might conceal hidden problems of a device when lending the device, and when the lessee discovers the problems after signing a lease agreement, the lessor denies it and refuses to pay compensation. During the leasing process, the leasing agreement might not be faithfully executed. A lessee might make a late payment, and when the contract is terminated, the lessor improperly deducts amounts from the deposit. An intermediary service provider might improperly invoice both the lessor and lessee for services.

SUMMARY OF THE INVENTIONS

In view of this, one or more embodiments disclosed herein provide a method and apparatus for leasing a measurement device based on a blockchain, a computer device, and a computer readable storage medium.

One or more embodiments disclosed herein provide a method for leasing a measurement device based on a blockchain. For example, a blockchain system can comprise a lease platform node device, a lessor client, and a lessee client. The lessor client and the lessee client are connected to the lease platform node device, and existing state information about the measurement device is stored in the blockchain. The method can be executed by the lease platform node device and can comprise: receiving a lease order for the measurement device that is sent by the lessee client; sending a lease notification based on the measurement device to the lessor client to notify the lessor to send the measurement device to the lessee; receiving, after the lessee receives the measurement device sent by the lessor, a device state detection request sent by the lessee client or the measurement device, wherein the device state detection request comprises first current state information about the measurement device; and detecting whether the first current state information matches the existing state information; and if yes, creating, based on a received lease confirmation notification sent by the lessee client, a lease contract for the measurement device and sending the lease contract to the blockchain.

Correspondingly, some embodiments provide an apparatus for leasing a measurement device based on a blockchain. A blockchain system can comprise a lease platform node device, a lessor client, and a lessee client, wherein the lessor client and the lessee client are connected to the lease platform node device, and existing state information about the measurement device is stored in the blockchain. The apparatus is applied at the lease platform node device and can comprise: a receiving unit configured to receive a lease order for the measurement device that is sent by the lessee client; a sending unit configured to send a lease notification based on the measurement device to the lessor client to notify the lessor to send the measurement device to the lessee, wherein the receiving unit is further configured to receive, after the lessee receives the measurement device sent by the lessor, a device state detection request sent by the lessee client or the measurement device, wherein the device state detection request comprises first current state information about the measurement device; a detection unit configured to detect whether the first current state information matches the existing state information; a lease contract creating unit configured to create, based on a received lease confirmation notification sent by the lessee client, a lease contract for the measurement device, wherein the sending unit is further configured to send the lease contract to the blockchain.

Accordingly, some embodiments provide a computer device, comprising: a memory and a processor, wherein the memory has stored thereon a computer program executable by the processor that, when executed by the processor, causes the implementation of the method for leasing a measurement device based on a blockchain as described in the embodiments disclosed herein.

Accordingly, some embodiments provide a computer readable storage medium having stored thereon a computer program that, when executed by a processor, causes the implementation of the method for leasing a measurement device based on a blockchain as described in one or more embodiments disclosed herein.

As can be seen from the above technical solutions, embodiments of the method and apparatus for leasing a measurement device based on a blockchain not only store the existing state information about the measurement device in the blockchain in a decentralized manner to prevent the information from being tampered with, thereby overcoming fraudulent acts of concealing information about leased device by a platform or an intermediary institute, but also detect device state of the measurement device based on the existing state information. When the existing state information about the measurement device matches state information deposited in the blockchain, a lessee may choose to lease that measurement device, thereby reducing the leasing risk for the lessee.

DETAILED DESCRIPTION OF EMBODIMENTS

Exemplary embodiments are described in detail herein, examples of which are shown in appended drawings. When reference is made to the appended drawings in the description below, identical numbers in different drawings represent identical or similar elements unless otherwise indicated. Implementations described in the following exemplary embodiments are not intended to represent all implementations consistent with one or more embodiments. Rather, they are merely examples of apparatuses and methods consistent with some aspects of one or more embodiments.

It should be noted that steps of one embodiment of a method disclosed herein may not be, in other embodiments, performed in the order shown and described in the specification. In some other embodiments, features of the method may be more or fewer than those described herein. Moreover, a single step described herein may be decomposed into a plurality of steps in other embodiments for the described purpose, while a plurality of steps described herein may be combined into a single step in other embodiment for the described purpose as well.

In a traditional device leasing process, there exist many problems: a lessee damages a leased device due to abnormal use but does not admit it and refuses to pay compensation; a lessor conceals hidden problems of a device when lending the device, and when the lessee discovers the problems after signing a lease agreement, the lessor denies it and refuses to pay compensation; during the leasing process, the leasing agreement might not be faithfully executed, the lessee makes a late payment, and when the contract is terminated, the lessor deducts the guarantee deposit; and an intermediary service provider might inappropriately charge both a lessor and a lessee for services to the leased measurement device.

As a special kind of device, a measurement device is more likely to be inaccurate or less precise in device measurement results during a leasing process. Moreover, for a large or precision measurement device, it is also an urgent demand of the measurement device leasing industry to trace the causes of device performance damage when device performance damage occurs.

In view of this, the present specification provides a method for leasing a measurement device based on a blockchain. A blockchain system comprises a lease platform node device, a lessor client and a lessee client. Existing state information about the measurement device is stored in the blockchain.

With respect to the type of the measurement device to which the disclosed embodiments can be applied, any devices, apparatuses, or device or apparatus modules that may have the function of measurement or calibration may all be encompassed within the scope of the measurement devices described herein.

A blockchain according to one or more embodiments described herein may, in particular, refer to a P2P network system achieved by various node devices through a consensus mechanism and having a distributed data storage structure, where data in a blockchain is distributed within various "blocks" consecutively connected in time. A latter block contains a data summary of a previous block, and full data backup of all or some of nodes is achieved according to different specific consensus mechanisms (such as POW, POS, DPOS or PBFT). It is well known to a person skilled in the art that since a blockchain system is running under a corresponding consensus mechanism, tampering with data recorded into a blockchain database with any node is difficult, for example, for a blockchain employing POW consensus, it would take a hash rate of at least 51% of the whole network to attack or tamper the existing data, therefore, the blockchain system is characterized by ensuring the security of data and protecting against attacking and tampering, which is incomparable by other centralized database systems. It can be seen therefrom that in the embodiments described herein, data recorded into a distributed ledger of the blockchain cannot be attacked or tampered, thereby ensuring the authenticity and fairness of performing data management and application based on data stored in the blockchain.

A service device terminal of the lease platform joins the blockchain by following a corresponding node protocol and running the installation of the node protocol program. As a node device of the blockchain, it can upload data transactions to and download data from the distributed database of the blockchain. The lessor or lessee is registered as a user of the lease platform, runs a client installation program on their respective terminals to join the blockchain network, and the lessor client or lessee client can serve as a node of the blockchain. When the lease platform is an alliance member node of an alliance chain, the lessor client or lessee client may also be a blockchain user client program that is connected to alliance member nodes and with controlled access permissions. In some embodiments, the lessor client or lessee client is may or may not be a node device associated with the blockchain.

When the lessee user or lessor user is registered as a user of the lease platform, they can submit their own identity information, such as name, address, identification number, payment to the lease platform. The lease platform can be configured for different platform uses or information access permissions for different lessees or lessors according to different types of users.

The lessor client can disclose the existing state information about the measurement device it holds on the lease platform for lessee users to view and filter (here, different levels of state information contents can be displayed for lessee users with different information access permissions). The existing state information may comprise identity identification information about the measurement device, performance indicator data of the measurement device, and other state information that may characterize the normal use of the measurement device, and the like.

The identity identification information about the measurement device may comprise a unique identification code corresponding to the measurement device. In order to facilitate the management of the measurement device, the measurement device may have a unique identification code corresponding to the lease platform. The unique identification code may be assigned by the lease platform itself, or may be a unique identification information about the measurement device itself, such as an electronic lead-sealing code, or a product serial number of the measurement device.

In order to prevent the lessee or lessor user from replacing parts of the measurement device without authorization, the identity identification information about the measurement device may also comprise unique identification codes corresponding to some components of the measurement device, such as an electronic lead-sealing code, a product serial number, an anti-counterfeit identification code corresponding to a key or an important part of the measurement device, so as to facilitate inspection and verification of the measurement device.

The state information that characterizes the normal or abnormal use of the measurement device may comprise indicator data of the operating environment (such as voltage, current, temperature, humidity) of the measurement device, indicator data of the operating condition (such as rotational speed, sensor signal connectivity), and authentication standard data (such as precision standard, certification grade), or abnormal prompt information. For some large or precision measurement devices, it is necessary to have an authentication institute (also commercially referred to as a "certifying entity") with a specific qualification certification to give a corresponding authentication standard data for circulation and use.

Optionally, in order to facilitate the lessee user to have a more comprehensive understanding of the state of the measurement device, the existing state information may further comprises one or more of production information (such as manufacturer, production batch, production process flow), metering authentication information (e.g., such as an authentication institute name, certification grade standard), transportation and logistics information during delivery or returning, historical lease record information, historical maintenance record information, historical operation information and other information about the measurement device. The data personnel in the art can add content or data of the existing state information about the measurement device based on a specific business requirement, which all are encompassed by the term "state information" as used herein.

In order to ensure that the existing state information about the measurement device will not be maliciously tampered with by the lease platform or other parties, the existing state information may be stored in the distributed database of the blockchain. Based on the tamper-resistant mechanism of the blockchain, the existing state information about the measurement device is deposited. In some embodiments, the specific sender of the existing state information can be the lessor client, a lease platform node device, or any fourth party node device, or any client commissioned by the lessor to manage the measurement device to be leased.

The specific storage location of the existing state information about the measurement device in the blockchain may depend on the type and setting of the blockchain. It can be saved in a block of the blockchain in the form of a transaction, can also be saved in the form of account content in an account storage space set by the blockchain for the measurement device, and can also be saved in a storage space corresponding to a contract account of the smart contract, but other techniques can also be used.

Figure 1:
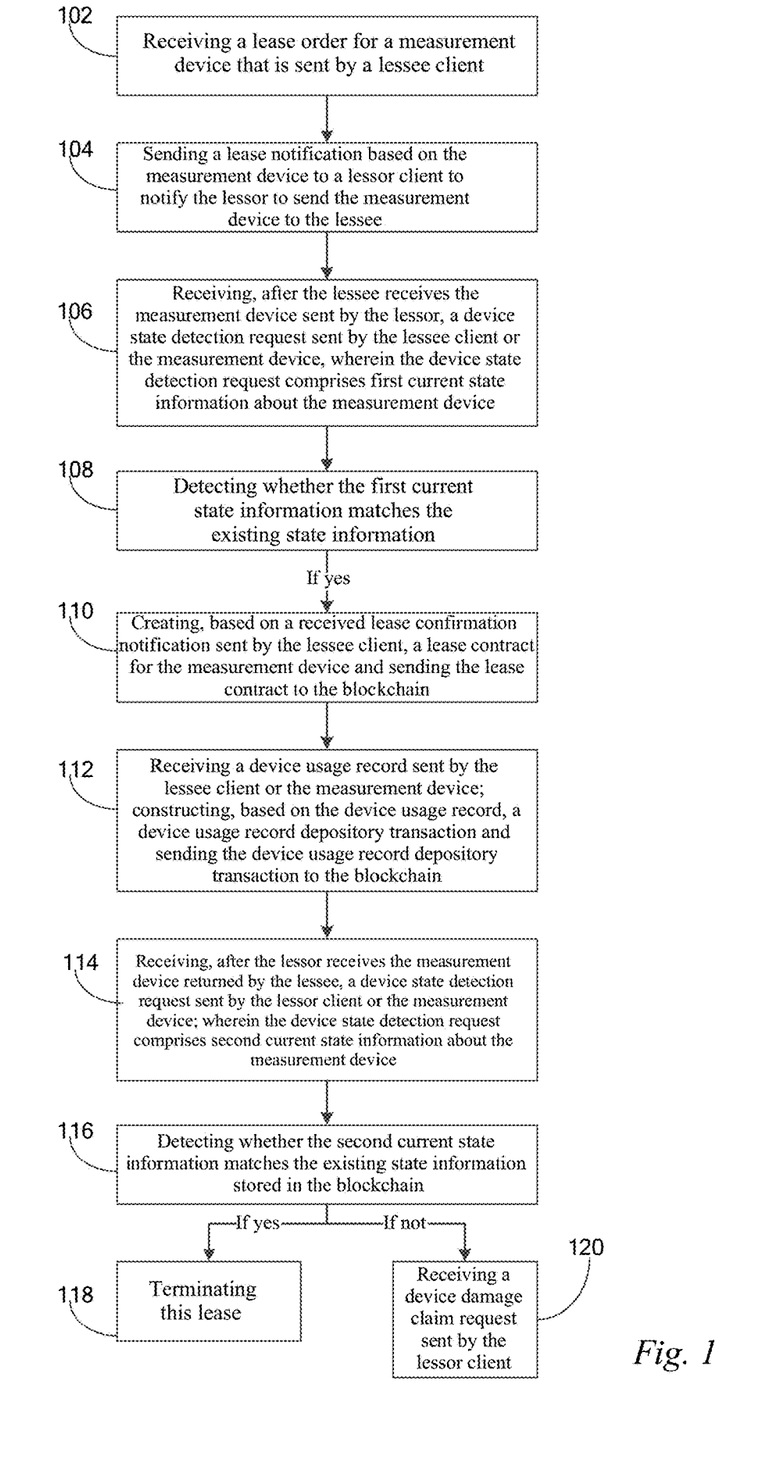
FIG. 1 is a schematic flow diagram illustrating a method for leasing a measurement device based on a blockchain according to an embodiment.

FIG. 1 illustrates a method for leasing a measurement device based on a blockchain provided in an example embodiment executed by a lease platform node device.

At block 102, the method includes receiving, for example, with a lease platform, a lease order for the measurement device that is sent by the lessee client. The lessee client can browse measurement devices available for lease on the lease platform, or make inquiries based on retrieval indicators or conditions of a measurement device to be leased. The lease platform can display a list of measurement devices that meet the retrieval indicators or conditions to the lessee client for selection, and place a lease order for the measurement device desired to be leased to the lease platform after the selection.

At block 104, the method includes sending a lease notification, for example, from the platform node device, based on the ordered measurement device, to the lessor client to notify the lessor to send the measurement device to the lessee.

In yet another illustrated embodiment, in order to prevent the lessee from placing a malicious order or damaging or replacing the measurement device after receiving the leased measurement device subsequently, the lessee, after placing a lease order to the lease platform, may also be required to pay a first amount of virtual resources or tokens based on the lessee's placed lease order. The first amount of virtual resources can be taken as a lease deposit (e.g., a security deposit) and be paid into an account of the lease platform or to a neutral third party institute.

In some embodiments, the representation types of the virtual resources or tokens may be monetary funds, points circulating on the lease platform, or virtual currency circulating on the blockchain, or the credit value of the lessee on the lease platform, or the like.

After the first amount of virtual resources or tokens is paid to a virtual resource account (e.g., held by the lease platform or a neutral third party), the platform node device sends a first depository transaction to the blockchain, wherein the first depository transaction is associated with a deposit of the first amount of virtual resources paid by the lessee. At this moment, the lease notification can comprise the first amount of the virtual resources paid by the lessee based on the lease order, thereby reducing the economic risk to be incurred by the lessor due to lessee's damage of the leased measurement device, refusal to return the leased measurement device, or refusal to pay for the rental of the leased measurement device after the lessor sends out the measurement device.

After receiving or accessing the lease notification, the lessor client can mail or deliver the requested/leased measurement device to an address provided by the lessee. In some embodiments, the lease platform node device may be connected to a server of a logistics agency, and the transportation and logistics information about the measurement device can be displayed on the lease platform. In some embodiments, the server of the logistics agency may serve as a node device of the blockchain and send the transportation and logistics information about the measurement device to the blockchain for storage utilizing the security (e.g., tamper-resistant mechanism) of the blockchain.

At block 106, after the lessee receives the measurement device sent by the lessor, the platform node device receives a device state detection request sent by the lessee client or the measurement device, wherein device state detection request comprises first current state information about the measurement device. In some embodiments, the first current state information about the measurement device refers to the state information about the measurement device when the lessee receives the measurement device. This information may be obtained by the lessee through inspection or operation of the measurement device, and transmitted to the lessee client in a manner of manual entry or communication with the measurement device.

By performing device state detection, for example, by detecting whether the first current state information matches the existing state information stored on the blockchain (described below with reference to Block 108), it may be determined if the measurement device sent by the lessor is inconsistent with the existing state information about the measurement device displayed by the lease platform, for example, if the lessor sent an inferior measurement device from that which was requested by the lessee, or if the measurement device was damaged or maliciously replaced during transportation, thereby reducing the lease risk of the lessee.

In some embodiments, the measurement device may include a networking module. For example, when the measurement device acquires or determines its first current state information, the measurement device can then send the device state detection request (e.g., comprising the first current state information) to the lease platform node device directly. Compared with the device state detection request being sent by the lessee client, in this example, the first current state information about the measurement device may be obtained more accurately.

At block 108, the method can include detecting whether the first current state information matches the existing state information. For example, in some embodiments, the matching of the first current state information with the existing state information means that information such as a unique identification code or an operating parameter contained in the first current state information conforms to the unique identification code or a device performance indicator contained in the existing state information. The embodiments disclosed herein are not limited to any particular state information content that is specifically referred to when matching the first current state information with the existing state information. In some embodiments, a corresponding comparison reference can be set up when detecting whether the first current state information matches the existing state information based on the type of the measurement device.

In some embodiments, in addition to a unique identification code of the measurement device, the existing state information stored in the blockchain may also comprise unique identification codes of key components of the measurement device, such as unique identification codes for a main board, a display screen, and a communication board card. For example, after the lessee receives the measurement device, the unique identification codes of the key components can be retrieved autonomously or automatically by the measurement device and included in the first current state information. In some embodiments, the lease platform verifies whether the current state data matches the standard state data by comparing the unique identification codes of the various key components.

In some embodiments, the existing state information stored in the blockchain may comprise the existing precision of the measurement device. After the lessee receives the measurement device, the current precision of the measurement device may be detected through standard precision detection methods. For example, for a weighing device, its precision may be obtained based on weighing a pre-determined weight to verify whether the first current state information matches the existing state information.

In some embodiments, the existing state information stored in the blockchain may comprise standard working indicator (e.g., as existing state data) of the measurement device. After the lessee receives the measurement device, the current working indicator (e.g., as current state data) of the measurement device may be inspected and obtained. For example, detecting whether the working voltage and current of the measurement device meet the rated voltage and current range stored in the blockchain can be used to verify whether the first current state information matches the existing state information.

At block 110, the method can include creating, based on a received lease confirmation notification sent by the lessee client, a lease contract based on the measurement device and sending the lease contract to the blockchain. For example, after the lessee client interacts with lease platform information and detects that the first current state information matches the existing state information, the lessee client may confirm this lease and send a lease confirmation notification to the lease platform, so that the lease platform may create a lease contract based on the measurement device and send the lease contract to the blockchain for depository.

In some embodiments, the lease contract may comprise state information such as identity information about the lessor and the lessee, and the unique identification code of the measurement device. In some embodiments, the lease contract may also comprise an amount of virtual resources that the lessee should pay based on the lease contract. For example, in order to make a deposit of a payment to the lessor (e.g., an amount of virtual resources), the lease platform node device may send a depository transaction to the blockchain, making a depository of the amount of virtual resources paid by the lessee client. In some embodiments, this depository transaction can the first or a subsequent (e.g., second) depository transaction. Other depository transactions can also be used.

In some embodiments, when placing a lease order, the lessee may pay a first amount of virtual resources that is not less than (i.e., equal to or greater than) the second amount. For example, the first amount of virtual resources are temporarily received by the lease platform or a neutral third party institute, and the lease platform, or the third party institute sends the second amount of virtual resources to the lessor's account after the establishment or validation of the lease contract.

In some embodiments, the lessee may also pay the first amount of virtual resources that is less than the second amount when placing the lease order. For example, the first amount of virtual resources are temporarily received by the lease platform, or the third party neutral institute, and are used as compensation (e.g., as a security deposit) to the lessor when the lessee breaches the contract or damages the measurement device. After the establishment or validation of the lease contract, the lessee should also pay the lessor the second amount of virtual resources as compensation for the rental of the measurement device, which can be less than the first amount.

The embodiments disclosed herein are not limited to a process order or manner in which the lessee pays the virtual resources. In some embodiments, a corresponding payment process (e.g., the process order, or manner in which the lessee pays the virtual resource) for the lessee can be determined or based on any specific business scenario.

In some embodiments, the lease contract may be expressed as an electronic contract signed by the lessee and the lessor, or as a smart contract that collects digital signatures of the lessee and the lessor.

At block 112, the method can include receiving a device usage record sent by the lessee client or the measurement device; constructing, based on the device usage record, a device usage record depository transaction; and sending the device usage record depository transaction to the blockchain for storage.

In some embodiments, the device usage record may comprise any data that is input, or automatically acquired or received by the platform node device, or generated by the measurement device during use. For example, the device usage record may comprise information such as image(s), temperature, three-dimensional size, weight acquired by the measurement device, measurement data records produced during normal use, error information when an abnormality occurs (e.g., abnormal temperature, overloaded shock, etc.), measurement device operation information (e.g., which may include information about the operating personnel of the measurement device, operation location information, operation time information, or operation content information, etc.), software information carried by the device, standard operation procedure (SOP) information data, and/or the like. In some embodiments, the lease platform may construct, based on the device usage record, a device usage record depository transaction and then send it to the blockchain for storage. For example, the device usage record depository transaction may contain some device state information. Since the existing state information about the measurement device is already stored in the blockchain, the device usage record depository transaction may be used to update the existing state information, or be compared with the existing state information so as to manage the state of the measurement device.

Since the reliability of device usage record data acquired by the measurement device autonomously (e.g., automatically), is significantly higher than that entered and edited by the lessee client, in some embodiments, the measurement device may be configured with a networking module which automatically transmits the device usage record data to the lease platform during use.

In some embodiments, for some measurement devices that are not configured with networking modules, data storage modules may also be provided inside the devices to save the device usage record data in real time. For example, the data storage modules can be protected by lead sealing, thereby preventing the lessee from damaging it. Once damaged, the lessee may be held responsible. The lessor or a maintainer designated by the lessor may regularly visit the site for routine maintenance of the measurement device. During the maintenance process, information saved in the data storage module of the measurement device can be sent to the lease platform, and uploaded to the blockchain by a lease platform node device for storage.

In some embodiments, the blockchain is used with a smart contract for managing device states, and a processing logic corresponding to a contract code of the smart contract comprises a device state management logic. In such embodiments, the method can further comprise invoking, in response to the device usage record depository transaction, the device state management logic of the smart contract to perform device state management of the measurement device. For example, the smart contract can be invoked to automatically perform state management of the measurement device by publishing the device usage record depository transaction to the blockchain at any time, greatly improving the efficiency of the state management of the measurement device. Moreover, the code of the smart contract and the execution of the smart contract both can be disclosed to node devices of the blockchain, and its running result needs to pass a node consensus verification of the blockchain, which improves the fairness and accuracy of the device state management compared with the centralized implementation of the state management of the measurement device by the lease platform. The lessor may be able to accurately determine the operating state of the leased measurement device through the blockchain, which overcomes the risk of the lessee or the lease platform potentially concealing the operating state of the device and thereby negatively impacting the interest of the lessor.

The embodiments disclosed herein are not limited to the number of the device usage record depository transactions. Those skilled in the art may design the number of device usage record depository transactions and sending time in a process based on actual needs.

Several implementations of smart contract based state management of a leased measurement device based on the different contents contained in the device usage records are described below.

Anti-Cheating Management of Measurement Device Based on Smart Contract

In some embodiments, the existing state information stored in the blockchain comprises standard state data of an anti-cheating object contained in the measurement device. The device usage record comprises current state data of the anti-cheating object contained in the measurement device. The blockchain further comprises a measurement device authentication institute node device, which is also referred to herein as an "authentication institute node". Invoking, in response to the device usage record depository transaction, the device state management logic of the smart contract to perform device state management of the measurement device can comprise: verifying whether the current state data matches the standard state data; and if not, outputting current state data, or preset cheating prompt information, or alarm information, so that the measurement device authentication institute node device, or the lessee node, or the lessor node can obtain the current state data, or the preset cheating prompt information, or the alarm information.

For example, measurement devices for weighing, such as cashier scales in supermarkets and toll scales on highways, are often used in trade settlement occasions. To prevent the measurement devices from being artificially damaged for improper benefits, the measurement devices may be configured with anti-cheating objects or mechanisms. For example, a certain amount of a gas (e.g., a noble gas) can be stored inside a weighing device, and the initial state gas concentration (standard state data) is saved in the blockchain as part of the existing state information. The weighing device monitors the concentration of the gas in real time or periodically, and transmits the concentration value (e.g., current state data) as part of the device usage record to the lease platform.

In some embodiments, the lease platform packages the received concentration value of the gas into the device usage record depository transaction, and publishes it to the blockchain, so as to invoke the smart contract to execute a device state management logic and verify whether the current gas concentration value is same as the initial state gas concentration value stored in the blockchain or within a preset fluctuation range, and if not, the smart contract may output current state data, or preset cheating prompt information, or alarm information, so that the measurement device authentication institute node device, or the lessee node, or the lessor node may obtain the current state data, or the preset cheating prompt information, or the alarm information.

In some embodiments, the execution result of the smart contract can be saved in a transaction log corresponding to the invoking transaction of the smart contract. For example, the transaction log (e.g., which may be encoded by default, such as with Recursive Length Prefix (RLP) encoding) is saved in the form of a transaction receipt in a receipt tree. An authentication party node device may obtain, by monitoring a locally maintained receipt tree, the cheating prompt information output by the smart contract based on verifying that the current state data does not match the standard state data, so that it can be known that the quality certification of the measurement device needs to be changed or revoked. For example, when the lease platform node device obtains the cheating prompt information, the measurement device may be locked by a remote locking method, so that the measurement device can only be unlocked by a node authenticated by the lease platform node device. The specific unlocking method, for example, however, is not limited to key unlocking.

Metering Performance Management of Measurement Device Based on Smart Contract

In some embodiments, metering performance data of a measurement device can be given by a certification qualified institute, but the metering performance data of the leased measurement device during use may deviate from the provided metering performance data, which may not meet an original device metering qualification issued by a metering authentication institute.

In some embodiments, the existing state information stored in the blockchain comprises standard data of the metering performance of the measurement device; the standard data of the metering performance is given by the authentication institute after the metering authentication of the measurement device; the device usage record generated during the lease use of the measurement device comprises current data of the metering performance of the measurement device; and the current data of the metering performance can be directly obtained by the measurement device, or can be obtained by the lessee's calculation and analysis of measurement process data of the measurement device. The blockchain system further comprises a measurement device authentication institute node device; and said invoking, in response to the device usage record depository transaction, the device state management logic of the smart contract to perform device state management of the measurement device comprises: verifying whether the current data of the metering performance matches the standard data of the metering performance; and if not, outputting the current data of the metering performance, or preset metering performance loss prompt information, so that the measurement device authentication institute node device, or the lessee node, or the lessor node can obtain the current data of the metering performance or the metering performance loss prompt information.

In some embodiments, the execution result of the smart contract is usually saved in a transaction log corresponding to the invoking transaction of the smart contract. For example, transaction log (e.g., which may be encoded by default, such as with RLP encoding) is saved in the form of a transaction receipt in a receipt tree. An authentication institute node device may obtain, by monitoring a locally maintained receipt tree, the metering performance loss prompt information output by the smart contract based on verifying that the current data of the metering performance does not match the standard data of the metering performance, so that it can be known that the quality certification of the measurement device needs to be changed or revoked. For example, when the lease platform node device obtains the metering performance loss prompt information, the measurement device may be locked by a remote locking method, so that the measurement device can only be unlocked by a node authenticated by the lease platform node device. The specific unlocking method, for example, however, is not limited to key unlocking.

Failure Cause Diagnosis and Management of Measurement Device Based on Smart Contract In some embodiments, a failure of the measurement device in use may be caused by improper operation, for example. Therefore, saving the operation information about the measurement device in the device usage record depository transaction stored in the blockchain is of great significance to determining a cause of the failure of the measurement device. For example, the operation information about the measurement device may comprise information about the operating personnel of the measurement device, operation location information, operation time information, operation content information, or operation environment information.

In some embodiments, invoking, in response to the device usage record depository transaction, the device state management logic of the smart contract to perform device state management of the measurement device comprises: outputting, based on the operation information about the measurement device, a failure cause or a failure phenomenon of the measurement device.

In some embodiments, a processing logic corresponding to the contract code of the smart contract may comprise a logic for diagnosing a failure cause based on the operation information about the measurement device. For example, a lessee may know the failure cause (e.g., the lessee may even include a failure response strategy) of the measurement device by interacting with lease platform information without the presence of professional maintenance personnel; thereby greatly saving the cost spent in performing failure analysis of the measurement device on site by professional failure maintenance or analysis personnel.

After the specific cause is diagnosed for the failure of the measurement device, the lessee client may initiate a device maintenance request to the lease platform; the blockchain system further comprises a maintainer client; and correspondingly, the method for leasing a measurement device based on a blockchain performed by a lease platform node device provided in this embodiment may further comprise: receiving a device maintenance request sent by the lessee client; and receiving, when the failure cause of the measurement device is a non-human damage failure, a device maintenance record sent by the maintainer client, and generating a new device usage record depository transaction based on the device maintenance record; and receiving, when the failure cause of the measurement device is a human damage failure, the device maintenance record sent by the maintainer client and a device damage claim request sent by the lessor client, and generating a new device usage record depository transaction based on the device maintenance record.

The present embodiments are not limited to any specific process for device damage claims. In some embodiments, when the lessee approves the claim for compensation requested by the lessor, it can be confirmed through the lease platform. For example, the lease platform, or neutral third party institute that has received the first amount of virtual resources may transfer the requested amount of virtual resources to the account of the lessor based on the compensation request, and write the virtual resource transfer process to the blockchain.

In some embodiments, when the lessee does not approve the compensation request applied by the lessor, the device damage claim request may be rejected. The lease platform may provide both parties with compensation defense or third party intervention and other business processes, or the lessor initiates device damage compensation recovery to the lessee outside the system, such as recovering the loss through judicial proceedings. At this moment, the lease platform, as a third party intermediary institute, may provide a damage certificate for the measurement device based on the device usage record (e.g., containing a maintenance record) and the existing state information. Because the device usage record and the existing state information are both stored in the blockchain, they are difficult to be tampered with by any party, thereby ensuring the fairness and security of the damage certificate.

Therefore, in the method for diagnosing a failure cause of a measurement device based on a smart contract, because the failure cause derived from the smart contract is stored in the blockchain, the lessee cannot deny the failure of the device artificially caused by himself/herself, thereby further protecting the lessor's rights and interests.

Life Management of Measurement Device Based on Smart Contract

The life of a measurement device is closely related to the way it is used. By using big data analysis to build an artificial intelligence model, the service life of the measurement device can be calculated by obtaining the usage information about the measurement device. In this embodiment, a processing logic corresponding to the contract code of the smart contract may contain a logic for judging and evaluating the measurement device based on the operation information about the measurement device.

Therefore, in some embodiments, the device usage record depository transaction may comprise operation information about the measurement device; wherein said invoking, in response to the device usage record depository transaction, the device state management logic of the smart contract to perform device state management of the measurement device comprises: performing a preset device service life assessment based on the operation information about the measurement device; and may further comprises: outputting, before the measurement device reaches the service life of the device, a prompt for expiration of the life of the measurement device.

In some embodiments, the lessee client may receive the prompt for expiration of the service life of the device during the information interaction with a lease platform node device, and submit a request for terminating the lease contract before the expiration of the life.

An example of device state management, under various usage scenarios, of the measurement device leased by the lessee, by a lease platform node device through the smart contract used on the blockchain is described above. A person skilled in the art may use a smart contract to determine a corresponding device state management of the measurement device according to a specific lease requirement of the lessee, so as to provide a more comprehensive and convenient service for the lessee to use the measurement device.

At block 114, the method can include receiving, after the lessor receives the measurement device returned by the lessee, a device state detection request sent by the lessor client or the measurement device; wherein the device state detection request comprises second current state information about the measurement device. For example, the device state detection request can be received by the platform node device.

At block 116, the method can include detecting whether the second current state information matches the existing state information stored in the blockchain; and if yes, at block 118, terminating this lease. In some embodiments, and optionally, before the lease is terminated, the lease platform may return virtual resources of which the amount is not greater than (i.e., equal to, or less than), the first amount to the lessee, and sends a third depository transaction to the blockchain, so as to make a depository of virtual resources of which the amount is not greater than the first amount and which are returned by the lease platform to the lessee; and if not, at block 120, receiving a device damage claim request sent by the lessor client. For example, the platform node device can receive the device damage claim request.

The embodiments disclosed herein are not limited to a specific time and condition for the termination of the lease. With respect to the time and condition for the termination of the lease, in some embodiment, the lessee may, after receiving the measurement device and before signing the lease contract with the lessor user, apply to terminate the lease or refuse the lease on the basis that the first current state information about the measurement device does not match the existing state information, or for any other reason (e.g., the lessee may terminate the lease at the expiration of the time limit specified in the lease contract; in advance due to failure of the measurement device, or due to expiration of life during the leasing process, etc.). Also, for example, the lessor may execute the termination procedure of the lease after being informed of the damage to the measurement device, etc.

In some embodiments, the lessee user shall return the leased measurement device to the lessor user after choosing to terminate the lease. The second current state information about the measurement device refers to the state information about the measurement device when the lessor receives the measurement device. This information may be obtained by the lessor through inspection or operation of the measurement device, and transmitted to the lessor client in a manner of manual entry or communication with the measurement device. By performing device state detection, detecting whether the second current state information matches the existing state information deposited in the blockchain may identify whether the measurement device sent by the lessee from is inconsistent with the existing state information about the measurement device displayed by the lease platform, for example, thereby determining if the lessee has replaced the measurement device or important parts of the measurement device, or if the measurement device had been damaged or maliciously replaced during transportation, thereby further protecting the rights and interests of the lessor.

In some embodiments, the measurement device may include a networking module. For example, when the measurement device acquires or determines its second current state information, the measurement device can then send the device state detection request to the lease platform node device directly. Compared with the device state detection request sent by the lessee client, in this example, the second current state information about the measurement device may be obtained more accurately.

The matching of the second current state information with the existing state information means that information such as the unique identification code or an operating parameter contained in the second current state information conforms to the unique identification code or a device performance indicator contained in the existing state information. With respect to state information content that is specifically referred to when matching the second current state information with the existing state information, in some embodiments, those skilled in the art may set corresponding comparison reference contents when detecting whether the second current state information matches the existing state information according to the type of the measurement device. For example, the content of the state information referred to when the first current state information is compared with the existing state information may be selected.

In some embodiments, the measurement device may be include a networking module. For example, when the measurement device acquires or determines its first current state information, the measurement device can then send the device state detection request to the lease platform node device directly. Compared with the device state detection request sent by the lessee client, in this example, the second current state information about the measurement device may be obtained more accurately.

In some embodiments, when the second current state information matches the existing state information stored in the blockchain, the first amount of virtual resources is charged as the security deposit, or deposit paid by the lessee for this lease. For example, the lease platform, or the neutral third party institute that receives the first amount of virtual resources may return up to the first amount of virtual resources to an account of the lessee. To prevent user repudiation, the lease platform may send a third depository transaction to the blockchain, so as to make a depository of virtual resources of which the amount is less than, or equal to, the first amount and which are returned by the lease platform, or the third party institute to the lessee.

In some embodiments, when the second current state information does not match the existing state information stored in the blockchain, the measurement device may have malfunctioned or may have been damaged, such as loss or failure of important parts, for example. At this time, the lessor client may initiate a device damage claim request to the lessee client through the lease platform.

With respect to device damage claims, in some embodiments for example, when the lessee approves the claim for compensation requested by the lessor, it can be confirmed through the lease platform. The lease platform, or a neutral third party institute that has received the first amount of virtual resources may transfer the requested amount of virtual resources to the account of the lessor based on the compensation request, and deposit the virtual resource transfer process in the blockchain.

In some embodiments, when the lessee does not approve the compensation request applied by the lessor, the compensation request may be rejected. For example, the lease platform may provide both parties with a compensation defense, or third party intervention and other business processes, or the lessor initiates device damage compensation recovery to the lessee outside the system, such as recovering the loss through judicial proceedings. At this time, the lease platform, as a third party intermediary institute, may generate, based on the second existing state information, the device usage record and the existing state information, a damage certificate for the measurement device. Because the second existing state information, the device usage record and the existing state information are all stored in the blockchain, they are difficult to be tampered with by any party, thereby ensuring the fairness of the damage certificate.

The processes of blocks 102 through 120 may be created and executed by a lease platform node device in a local server terminal, or may be executed by a smart contract used by the lease platform node device on the blockchain, for example, however, the embodiments disclosed herein are not limited to this configuration.

One or more embodiments further provide an apparatus 20 for leasing a measurement device based on a blockchain, which can be used to execute the methods described above with reference to FIG. 1, or other methods. The apparatus 20 may be implemented by software, and may also be implemented by hardware or a combination of software and hardware. Taking software implementation as an example, as an apparatus in a logical sense, it is formed by reading a corresponding computer program instruction into a memory through a CPU (Central Process Unit) of a device where it is located. In terms of hardware, in addition to the CPU, the internal storage, and the memory shown in FIG. 3, the device where the above apparatus is located generally also includes other hardware (e.g., such as a chip for wireless signal transmission and reception, and/or a board card for realizing network communication function, and/or other hardware).

Figure 2:
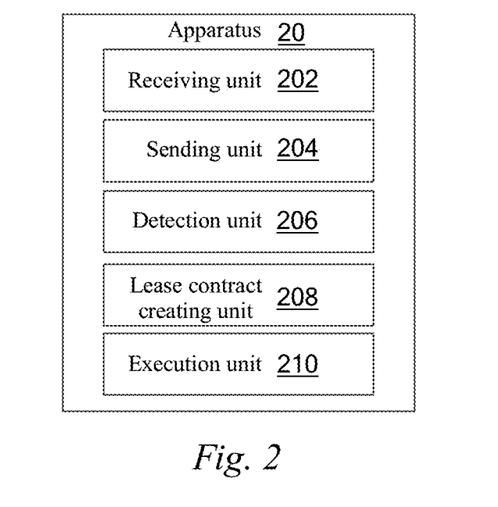
FIG. 2 is a schematic diagram of an apparatus for leasing a measurement device based on a blockchain according to an embodiment.

In FIG. 2, an apparatus 20 for leasing a measurement device based on a blockchain is shown. For example, a blockchain system comprises a lease platform node device, a lessor client and a lessee client. The lessor client and the lessee client are connected to the lease platform node device, and existing state information about the measurement device is stored in the blockchain. The apparatus 20 can be at a location of the lease platform node device and can comprise: a receiving unit 202 configured to receive a lease order for the measurement device that is sent by the lessee client; a sending unit 204 configured to send a lease notification based on the measurement device to the lessor client to notify the lessor to send the measurement device to the lessee; the receiving unit 202 further configured to receive, after the lessee receives the measurement device sent by the lessor, a device state detection request sent by the lessee client or the measurement device, wherein the device state detection request comprises first current state information about the measurement device; a detection unit 206 configured to detect whether the first current state information matches the existing state information; a lease contract creating unit 208 configured to create, based on a received lease confirmation notification sent by the lessee client, a lease contract for the measurement device; and the sending unit 204 further configured to send the lease contract to the blockchain.

In some embodiments, the existing state information comprises: a unique identification code corresponding to the measurement device, or unique identification codes corresponding to some components of the measurement device.

In some embodiments, the existing state information further comprises state information that may characterize normal or abnormal use of the measurement device.

In some embodiments, the existing state information further comprises one or more of production information, metering authentication information, transportation and logistics information, historical lease record information, historical maintenance record information, historical operation information and other information about the measurement device.

In some embodiments, the lease notification comprises a first amount of virtual resources that the lessee has paid based on the lease order; and the receiving unit 202 is further configured to receive the first amount of virtual resources paid by the lessee client; and the sending unit 204 is further configured to send a first depository transaction to the blockchain, wherein the first depository transaction makes a depository of the first amount of virtual resources paid by the lessee client.

In some embodiments, the lease contract comprises a second amount of virtual resources that the lessee should pay based on the lease contract; and the sending unit 204 is further configured to send a second depository transaction to the blockchain, wherein the second depository transaction makes a depository of the second amount of virtual resources being paid by the lessee client.

In some embodiments, the receiving unit 202 is further configured to: receive a device usage record sent by the lessee client or the measurement device; and the sending unit 204 is further configured to construct, based on the device usage record, a device usage record depository transaction and send the device usage record depository transaction to the blockchain.

In some embodiments, the blockchain is used with a smart contract for managing device states, and a processing logic corresponding to a contract code of the smart contract comprises a device state management logic; and the apparatus further comprises an execution unit 210 configured to: invoke, in response to the device usage record depository transaction, the device state management logic of the smart contract to perform device state management of the measurement device.

In some embodiments, the existing state information comprises standard state data of an anti-cheating object contained in the measurement device; the device usage record depository transaction comprises current state data of the anti-cheating object contained in the measurement device; the blockchain further comprises a measurement device authentication institute node device; and the execution unit 210 is further configured to: verify whether the current state data matches the standard state data; and if not, output current state data, or preset cheating prompt information, or alarm information, so that the measurement device authentication institute node device, or the lessee node, or the lessor node can obtain the current state data, or the preset cheating prompt information, or the alarm information.

In some embodiments, the existing state information comprises standard data of the metering performance of the measurement device; the device usage record depository transaction comprises current data of the metering performance of the measurement device; the blockchain further comprises a measurement device authentication institute node device; and wherein the execution unit 210 is further configured to: verify whether the current data of the metering performance matches the standard data of the metering performance; and if not, output the current data of the metering performance, or preset metering performance loss prompt information, so that the measurement device authentication institute node device, or the lessee node, or the lessor node can obtain the current data of the metering performance or the metering performance loss prompt information.

In some embodiments, the apparatus 20 further comprises: a locking unit 212 (not shown in FIG. 2) configured to lock the measurement device, so that the measurement device can only be unlocked by a node authenticated by the lease platform node device.

In some embodiments, the device usage record depository transaction comprises operation information about the measurement device; and wherein the execution unit 210 is further configured to: output, based on the operation information about the measurement device, a failure cause or a failure phenomenon of the measurement device.

In some embodiments, the device usage record depository transaction comprises operation information about the measurement device; and wherein the execution unit 210 is further configured to: perform a preset device service life assessment based on the operation information about the measurement device; and output, before the measurement device reaches the service life of the device, a prompt for expiration of the life of the measurement device.

In some embodiments, the blockchain system further comprises a maintainer client; and the receiving unit 202 is further configured to receive a device maintenance request sent by the lessee client; receive, when the failure cause of the measurement device is a non-human damage failure, a device maintenance record sent by the maintainer client, and generate a device usage record depository transaction based on the device maintenance record; and receive, when the failure cause of the measurement device is a human damage failure, the device maintenance record sent by the maintainer client and a device damage claim request sent by the lessor client, and generate the device usage record based on the device maintenance record.

In some embodiments, the receiving unit 202 is further configured to: receive, after the lessor receives the measurement device returned by the lessee, a device state detection request sent by the lessor client or the measurement device, wherein the device state detection request comprises second current state information about the measurement device; the detection unit 206 is further configured to detect whether the second current state information matches the existing state information stored in the blockchain; and if yes, return virtual resources of which the amount is not greater than the first amount to the lessee, and send a third depository transaction to the blockchain, so as to make a depository of virtual resources of which the amount is not greater than the first amount and which are returned by the lease platform to the lessee; and if not, receive a device damage claim request sent by the lessor client.

In some embodiments, the apparatus 20 further comprises: a generation unit 214 configured to generate, based on the second current state information, the device usage record and the existing state information, a damage certificate for the measurement device.

With respect to the implementation of the functions and effects of the components of apparatus 20, the implementation of the corresponding methods for leasing a measurement device based on a blockchain performed by a lease platform node device, and for the relevant parts, can be applied as described herein.

The embodiments of the apparatus are merely illustrative, and components illustrated as separate components may be or may not be physically separated, and the components illustrated as units may or may not be physical modules, that is, may be positioned at one place or may be distributed to multiple network modules. Some or all of the units or modules may be selected according to actual needs to achieve the objectives of the solution(s) described herein.

The apparatus, units, and modules described in the above embodiments may be specifically implemented by a computer chip or entity, or may be implemented by a product having a certain function. A typical implementation device is a computer, and the specific form of the computer may be a personal computer, a laptop computer, a cellular phone, a camera phone, a smart phone, a personal digital assistant, a media player, a navigation device, an email sending and receiving device, and a game control desk, a tablet computer, a wearable device, or a combination of any of these devices.

Figure 3:
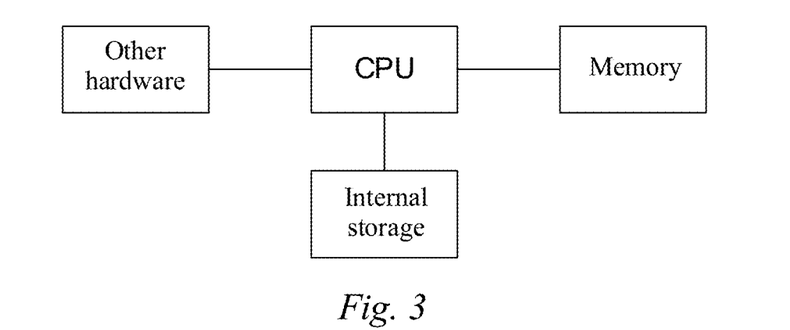
FIG. 3 is a structural diagram of hardware for implementing embodiments for leasing a measurement device based on a blockchain.

Corresponding to the above embodiments of the method, the one or more embodiments further provides a computer device, as shown in FIG. 3, which includes a memory and a processor. The memory has stored thereon a computer program executable by the processor. When the stored computer program is executed by the processor, the various steps of the method for leasing a measurement device based on a blockchain, which is performed by a lease platform node device as described in one or more embodiments is implemented. A description of the method for leasing a measurement device based on a blockchain performed by the lease platform node device is described in more detail herein Corresponding to the above embodiments of the method, the embodiments of the specification further provide a computer readable storage medium which has stored thereon a computer program that, when executed by a processor, cause the implementation of the method for leasing a measurement device based on a blockchain, which is performed by the lease platform node device as described herein. A description of the method for leasing a measurement device based on a blockchain performed by the lease platform node device is described in more detail above.

The above are only examples and are not intended to limit the scope of the invention. Any modification, equivalent replacement, or improvement made within the spirit and principles of the invention described herein shall be included within the scope described herein.

In a typical configuration, a computing device comprises one or more central processing units (CPUs), an input/output interface, a network interface, and a memory.

The memory may include a non-permanent memory, a random access memory (RAM) and/or a non-volatile memory (such as a read-only memory (ROM) or a flash memory (flash RAM)) and so on in a computer-readable medium. The memory is an example of the computer-readable mediums.

The computer-readable medium comprises non-volatile and volatile media, and removable and non-removable media, wherein information storage can be implemented with any method or technology. Information may be computer-readable instructions, data structures, modules of programs, or other data.

The examples of a computer storage medium include but are not limited to a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and carrier.

It should further be noted that the terms "comprising", "including" or any other variations thereof are intended to cover non-exhaustive inclusion, so that processes, methods, merchants or devices including a series of elements not only include those elements but also include other elements which are not listed expressly or include all inherent elements of such processes, methods, commodities or devices. If no more limitations are made, an element defined by "comprising a/an . . . " does not exclude other identical elements existing in the process, the method, the commodity, or the device which includes the element.

A person skilled in the art understands that an embodiment may be provided as a method, a system, or a computer program product. Therefore, the one or more embodiments described may use a form of hardware only embodiments, software only embodiments, or embodiments with a combination of software and hardware. Moreover, the one or more embodiments described may use a form of a computer program product that is implemented on one or more computer-usable storage media (including but not limited to a disk memory, a CD-ROM, an optical memory, and the like) that comprise computer usable program code.

What is claimed is:

1. A computer-implemented method, comprising:
    receiving, on a platform device and from a lessor device, attribute information for a first measurement device that is available for leasing by the lessor device;
    generating and transmitting, to a lessee device and from the platform device, display instructions configured to present the attribute information on a display;
    receiving, from the lessee device and on the platform device, an order request to lease the first measurement device;
    transmitting, from the platform device and to the lessor device, notification of the order request;
    receiving, from the lessee device or the first measurement device and on the platform device, device state information indicating that the first measurement device was successfully received;
    in response to receiving the device state information, performing a first determination, by the platform device, that the device state information is consistent with the attribute information;
    receiving, from the lessee device and on the platform device, lease confirmation instructions;
    based on the first determination and the lease confirmation instructions, generating a software lease contract confirming lease terms associated with the first measurement device;
    generating and executing, by the platform device, first blockchain writing instructions to write the software lease contract to a first blockchain, wherein the lease contract is configured to collect digital signatures from the lessor device and the lessee device;
    access, by the platform device, standard performance data and current performance data corresponding to the first measurement device;
    in response to a determination that at least a portion of the current performance data as compared with at least a portion of the standard performance data do not match, generating and sending, by the platform device and to the first measurement device or the lessee device, remote locking instructions that are configured, once executed, to remotely lock and prevent the first measurement device from performing measurements; and
    accessing and executing, by the first measurement device, the remote locking instructions to lock the first measurement device from performing measurements while the first measurement device remains locked.

2. The computer-implemented method of claim 1, further comprising:
    generating and executing, by the platform device, the measurement device, or the lessor device, second blockchain writing instructions to write at least a portion of the attribute information to the first blockchain.

3. The computer-implemented method of claim 1, wherein, after digital signatures are collected for the software lease contract, the software lease contract is further configured to remit payment to the lessor device.

4. The computer-implemented method of claim 1, wherein the order request includes transaction information confirming transfer of virtual resources or tokens as a preliminary payment, wherein the transaction information corresponds to a transaction written to the first blockchain.

5. The computer-implemented method of claim 1, further comprising:
    installing, on one or more of: the platform device, the lessor device, and the lessee device, one or more node protocol programs to join the first blockchain so that the one or more of the platform device, the less or device, and the lessee device are nodes of a plurality of nodes connected to, verifying, and maintaining the first blockchain.

6. The computer-implemented method of claim 1, wherein at least a portion of the standard performance data is determined by an authentication institute device comprising one or more node protocol programs configured to join the first blockchain so that the authentication institute device is a node of a plurality of nodes connected to, verifying, and maintaining the first blockchain.

7. The computer-implemented method of claim 6, further comprising:
  generating and executing, by the authentication institute device or the measurement device, third blockchain writing instructions to write at least a portion of the standard performance data to the first blockchain.

8. A system comprising:
  a computer readable storage medium having program instructions embodied therewith; and one or more processors configured to execute the program instructions to cause the system to perform the computer-implemented method of claim 1.

9. The system of claim 8, the one or more processors further configured to:
  generate and execute, by the platform device, the measurement device, or the lessor device, second blockchain writing instructions to write at least a portion of the attribute information to the first blockchain.

10. The system of claim 8, wherein, after digital signatures are collected for the software lease contract, the software lease contract is further configured to remit payment to the lessor device.

11. The system of claim 8, wherein the order request includes transaction information confirming transfer of virtual resources or tokens as a preliminary payment, wherein the transaction information corresponds to a transaction written to the first blockchain.

12. The system of claim 8, the one or more processors further configured to:
  install, on one or more of: the platform device, the lessor device, and the lessee device, one or more node protocol programs to join the first blockchain so that the one or more of the platform device, the lessor device, and the lessee device are nodes of a plurality of nodes connected to, verifying, and maintaining the first blockchain.

13. The system of claim 12, wherein the remote locking instructions are further configured to permit unlocking of the first measurement device by one or more nodes of the plurality of nodes that are authenticated by the platform device.

14. The system of claim 8, wherein at least a portion of the standard performance data is determined by an authentication institute device comprising one or more node protocol programs configured to join the first blockchain so that the authentication institute device is a node of a plurality of nodes connected to, verifying, and maintaining the first blockchain.

15. The system of claim 14, the one or more processors further configured to:
  generate and execute, by the authentication institute device or the measurement device, third blockchain writing instructions to write at least a portion of the standard performance data to the first blockchain.

16. A computer program product comprising a non-transitory computer-readable storage medium having program instructions embodied therewith, the program instructions executable by one or more processors to cause the one or more processors to perform the computer-implemented method of claim 1.

17. The computer program product of claim 16, further comprising instructions executable by the one or more processors to cause the one or more processors to:
  generate and execute, by the platform device, the measurement device, or the lessor device, second blockchain writing instructions to write at least a portion of the attribute information to the first blockchain.

18. The computer-implemented method of claim 1, wherein the standard performance data corresponds to expected metering performance for measurement devices and the current performance data corresponds to measured metering performance for the first measurement device.

19. The computer-implemented method of claim 1, the remote locking instructions further comprise a preprogrammed unlocking procedure that permits unlocking of the first measurement device by the platform device or by another node connected to the first blockchain.

20. The computer-implemented method of claim 1, further comprising:
  based at least in part on a determination that the first measurement device is locked, generating and sending, to the first measurement device or the lessee device and by the platform device or by another node connected to the first blockchain, remote unlocking instructions that are configured to, once executed, unlock the first measurement device; and
  accessing and executing, by the first measurement device, the remote unlocking instructions to unlock the first measurement device so that the first measurement device can performing measurements.

\* \* \* \* \*